J. E. OLLIVIER.
MOTOR VEHICLE FOR SOFT GROUND.
APPLICATION FILED MAY 7, 1918.

1,340,789.

Patented May 18, 1920.
11 SHEETS—SHEET 1.

INVENTOR
Jocelyn E. Ollivier
BY
ATTORNEY

J. E. OLLIVIER.
MOTOR VEHICLE FOR SOFT GROUND.
APPLICATION FILED MAY 7, 1918.

1,340,789. Patented May 18, 1920.
11 SHEETS—SHEET 2.

INVENTOR
Jocelyn E. Ollivier
BY
ATTORNEY

J. E. OLLIVIER.
MOTOR VEHICLE FOR SOFT GROUND.
APPLICATION FILED MAY 7, 1918.

1,340,789.

Patented May 18, 1920.
11 SHEETS—SHEET 4.

INVENTOR
Jocelyn E. Ollivier
BY
ATTORNEY

J. E. OLLIVIER.
MOTOR VEHICLE FOR SOFT GROUND.
APPLICATION FILED MAY 7, 1918.

1,340,789.

Patented May 18, 1920.
11 SHEETS—SHEET 5.

INVENTOR
Jocelyn E. Ollivier
BY
Emil Roiwolyke
ATTORNEY

J. E. OLLIVIER.
MOTOR VEHICLE FOR SOFT GROUND.
APPLICATION FILED MAY 7, 1918.

1,340,789.

Patented May 18, 1920.
11 SHEETS—SHEET 7.

INVENTOR
Jocelyn E. Ollivier
BY
ATTORNEY

J. E. OLLIVIER.
MOTOR VEHICLE FOR SOFT GROUND.
APPLICATION FILED MAY 7, 1918.

1,340,789.

Patented May 18, 1920.
11 SHEETS—SHEET 9.

INVENTOR
Jocelyn E. Ollivier

BY
ATTORNEY

J. E. OLLIVIER.
MOTOR VEHICLE FOR SOFT GROUND.
APPLICATION FILED MAY 7, 1918.

1,340,789.

Patented May 18, 1920.
11 SHEETS—SHEET 10.

INVENTOR
Jocelyn E. Ollivier
BY
ATTORNEY

J. E. OLLIVIER.
MOTOR VEHICLE FOR SOFT GROUND.
APPLICATION FILED MAY 7, 1918.

1,340,789.

Patented May 18, 1920.

INVENTOR:
Jocelyn E. Ollivier
BY
ATTORNEY

UNITED STATES PATENT OFFICE.

JOCELYN EMILE OLLIVIER, OF PARIS, FRANCE.

MOTOR-VEHICLE FOR SOFT GROUND.

1,340,789.

Specification of Letters Patent. Patented May 18, 1920

Application filed May 7, 1918. Serial No. 233,137.

*To all whom it may concern:*

Be it known that I, JOCELYN EMILE OLLIVIER, citizen of the Republic of France, and resident of Paris, France, (post office address 17 Rue Desbordes-Valmore,) have invented a new and useful Motor-Vehicle for Soft Ground, which improvements are fully set forth in the following specification.

The invention relates to a motor vehicle which can be used equally well on soft ground, on snow and sand, as well as on ordinary roads.

This vehicle, in addition to the two ordinary driving wheels, comprises two endless track propellers arranged in front of the driving wheels and preferably driven by means of chains by pinions mounted on a spindle normal to the main driving shaft and driven by the same.

The accompanying drawings show by way of example a few constructions according to the invention.

Fig. 12 is a detail view showing the adjustable connection of the stay plates to the rear axle.

Fig. 13 is a transverse section through one of the stay plates and its attached guard or cover plate.

Fig. 18' is a fragmental detail of a modified tension-adjusting device.

Fig. 23' represents diagrammatically still another modified form of mounting.

Fig. $23^2$ shows a modified form of reversing gearing.

Figure 1:
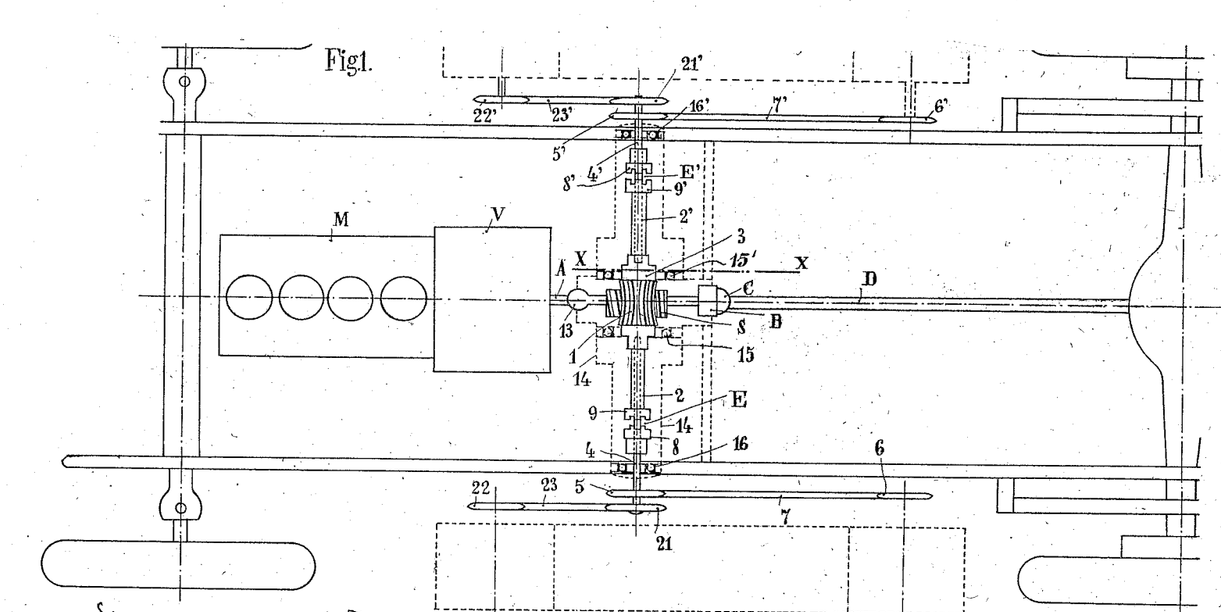
Figure 1 is a plan view of the improved motor car.
Figure 2:
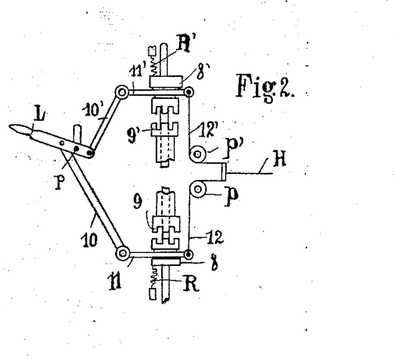
Fig. 2 shows an arrangement for controlling the clutches of the tractor chains.
Figure 3:
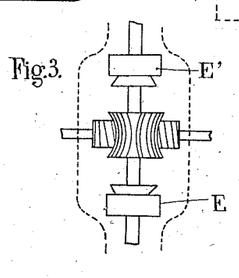
Fig. 3 shows a modified form of clutch which may be used.
Figures 8, 9, 10, 11:
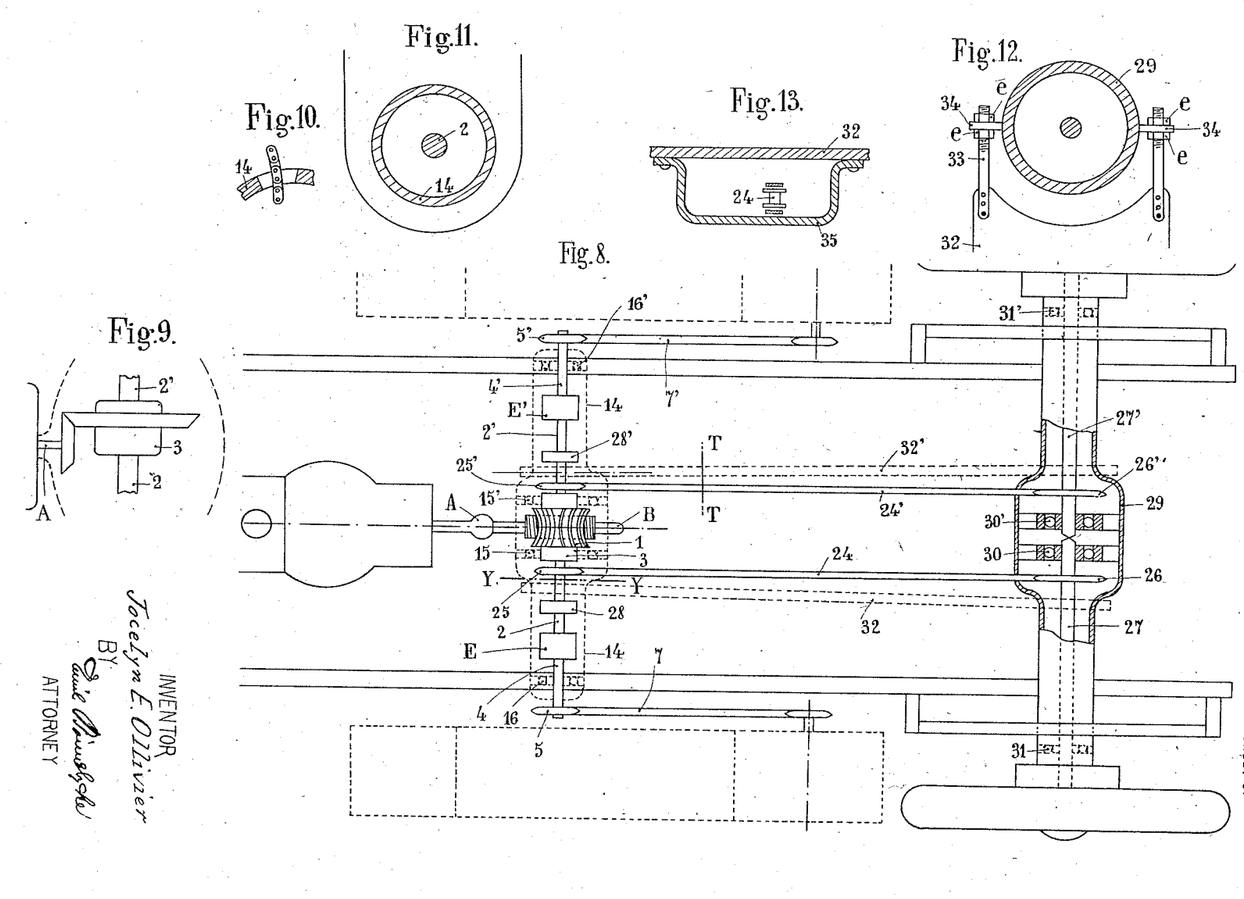
Fig. 8 is a plan view of a modified construction of the motor car.
Fig. 9 is a modified construction showing a bevel pinion driving gear applicable in the case of the construction shown in Fig. 8.
Fig. 10 is a fragmental detail sectional view showing one of the chain openings provided in the central gear case or bridge.
Fig. 11 is a transverse section taken through said gear case on line Y—Y, Fig. 8.
Figure 14:
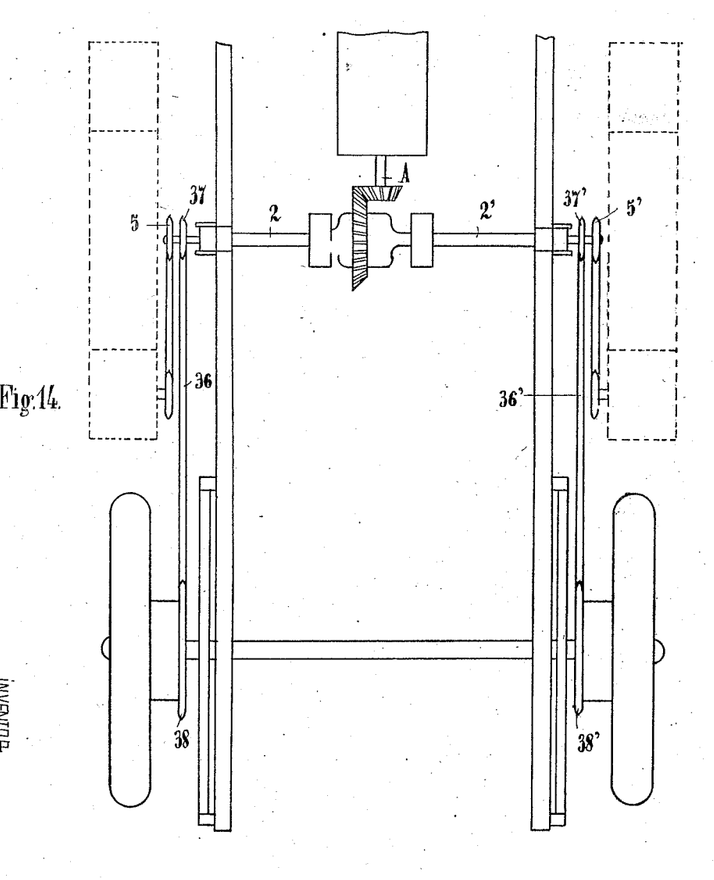
Fig. 14 is a partial plan showing a modification of the construction shown in Fig. 8.

As will be seen in Fig. 1, the car is provided with an engine M, and with a change speed gear V having a clutch of any desired type, in the same way as the ordinary car. The driving shaft A is connected by means of a Cardan joint C to the transmission shaft D which drives the wheel shaft or rear axle. The shaft A carries a worm S which transmits its motion to a pinion 1 mounted on the transverse shaft 2, 2'. The pinion 1 could be either mounted direct on the shaft 2, 2' which would then be of one-piece construction, or the two members or sections of the shaft may be separate from each other and connected by the differential 3, in which instance the pinion 1 would be mounted on the differential. The shaft sections 2 and 2' are hollow, and the two spindles 4, 4' arranged in line with them, rotate inside them. The spindles 4 and 4' carry pinions 5 and 5' which preferably by means of chains 7 and 7' drive the pinions 6 and 6' mounted on the spindles of the pinions which guide the endless tractor chains. In order to simplify the drawing, and as several methods of fitting endless track propellers will be hereinafter described in detail, Fig. 1, as well as Figs. 8 and 14, show the said tractors merely in a diagrammatic manner. The spindles 4 and 4' are loose relatively to the shaft sections or shafts 2 and 2', but they can be caused to take part in the rotation of the latter by means of clutches E and E' of any desired type. Fig. 1 shows, by way of example, claw clutches. The tubular shafts 2 and 2' terminate in claws 9 and 9' and the shafts 4 and 4' carry two claws 8 and 8' which can slide on the shafts and rotate with them and which can engage with the claws 9 and 9'. The movement of the claws 8 and 8' is obtained by any desired means, for instance by means of a lever L (Fig. 2) pivoted at P and transmitting its movement to levers 10 and 10' pivoted to it and to forks 11 and 11' which move the claws 8 and 8'. The two forks could also be controlled by means of cables 12 and 12' passing over pulleys $p$ and $p'$ and afterward joined together so that they can be pulled by means of a single cable H, return springs R and R' having the tendency to keep the clutches out of engagement. It goes without saying that it is possible to use clutches of any desired construction, for instance, as shown in Fig. 3, cone clutches. The claw clutches are the simplest, but disk clutches are to be greatly recommended on account of their gradual action and of the space which they occupy.

Figure 4:
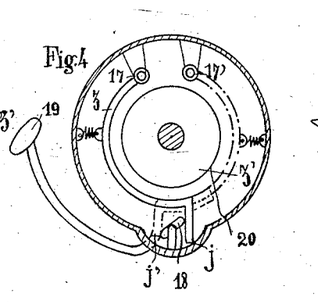
Figs. 4 and 5 show devices for braking the tractor chains.
Figure 5:
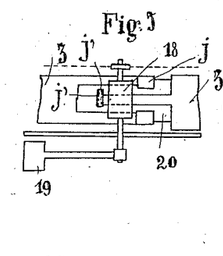

Although the shaft A rotates in line with the engine shaft of which it constitutes the end, it may be preferable, on account of its length, to cut it in half and to connect the two halves by a Cardan joint 13 (Fig. 1). Although this is less advisable, it is possible to do the same as regards the shafts 4 and 4'. The transverse or cross-shaft could be supported by the chassis in various ways, the best of which is to inclose it in a gear case 14 shown in dotted lines in Figs. 1 and 8 which is secured to the chassis. The shaft is supported in the said gear case which forms a bridge, by ball bearings 15, 16, 15', 16'. This gear case will also be used for supporting the shaft A. To facilitate the turning, only one of the tractor chains may be thrown into gear when the clutches are mounted on the transverse or cross-shaft; at the same time a braking action may be exercised on the other chain. A single control could be designed for these two operations. If the shaft 2, 2' carries a differential, it is sufficient to brake one of the tractors. To be able to do so, the shaft 2 (or the shaft 4) and the shaft 2' (or the shaft 4') are each provided with a brake of any desired kind. By way of example, Figs. 4 and 5 show a method of construction of this system: Fig. 4 shows the shaft and the gear case in section on line X—X of Fig. 1. The segments $z$ and $z'$ are mounted in the interior of the gear case by means of pivot pins 17 and 17' (Fig. 4). The end portion of the segment $z'$ slidably engages with the end portion of the segment $z$ which is provided for the purpose with a recessed part, and between the terminals $j'$ and $j$ of said portions there is arranged a cam 18 which, on being rotated by pressing on a pedal 19, will tend to move the said terminals $j$ and $j'$ away from each other, that is to say to press the segments $z$ and $z'$ against the rim of the disk 20 secured to the differential casing, or to the shaft if there be no differential. It goes without saying that in the contrary case there will be two of these brakes arranged symmetrically.

Figure 6:
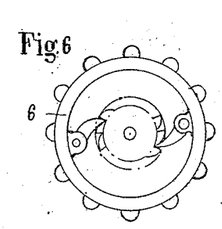
Figs. 6 and 7 are detail views of the ratchet gears of the pinions of the tractor chains.
Figure 7:
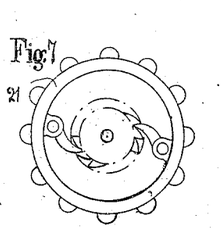

When the endless tractors are very long, it may be preferable, for reversing, to arrange the engine to drive the front pinion of said chain, instead of the rear pinion. To that end, each of the shafts 4 and 4', instead of having only a single pinion, will have two pinions 5 and 21, 5' and 21', one driving the rear pinion of the chain, the other the front pinion (Fig. 1). These pinions are provided with ratchet gears like the free wheel pinions of bicycles, but the ratchet teeth of the pinions 5 and 21 extend in opposite directions (Figs. 6 and 7), so that during the driving forward, the pinions 5 and 5' only are driven, while the pinions 21 and 21' alone are driven during reversing. The pinions 21 and 21' drive pinions 22 and 22' which are mounted on the spindles of the front pinions of the endless tractors by means of driving chains 23 and 23'.

In the construction shown in Fig. 8, the driving shaft A as before transmits its motion to the cross-shaft 2, 2' which carries the two pinions 5 and 5' which, by means of the chains 7 and 7', transmit the motion to the endless tractor chains; but the driving movement, instead of being transmitted to the rear wheels by means of a Cardan shaft, is transmitted by means of chains 24 and 24' which pass, on the one hand, over the pinions 25 and 25' secured respectively to the shafts 2 and 2', and on the other hand, over the pinions 26 and 26' which are mounted on the two shafts or shaft sections 27 and 27' which drive the rear wheels. The shafts 2 and 2' engage with the differential 3 which is then essential and which carries the pinion 1 engaging with the worm on the engine or driving shaft. It must be pointed out that it would also be possible to utilize a bevel pinion drive (Fig. 9). The shafts 2 and 2' carry brakes 28 and 28' of any desired construction, shown diagrammatically in Fig. 8, and the rotary movement of said shafts is transmitted to the shafts 4 and 4' as before by means of clutches E and E', preferably disk clutches. As in the preceding case, it is preferable to use a gear case 14 forming a bridge which supports the shafts 2, 2' and 4, 4' as well as the shaft A and is supported on the chassis; only in the said gear case it is necessary to provide small orifices for the passage of the chains 24 and 24' (see Fig. 10).

The two shafts 27 and 27' which drive the rear wheels (Fig. 8) are supported by a gear case 29 forming a bridge or rear axle which also supports the rear springs of the car. The shafts 27 and 27' will rotate in the said gear case, being supported by ball bearings 30, 31, 30', 31'; orifices are also provided in this gear case for the passage of the chains.

The two metal plates 32 and 32' (shown in dotted lines in Fig. 8) will play the part of stays, and they are pivotally mounted at one end on the gear case 14 (or on parts secured to the said gear case) about which they can oscillate (see Fig. 11), and are secured at the other end to the rear axle, preferably in an adjustable manner, in order to enable them to be used as chain stretchers. For instance, to each plate 32 are secured screw-threaded rods 33 (Fig. 12) which are fastened to lugs 34 secured to the rear axle, by means of nuts e; it will be seen that, by screwing the said nuts to a greater or less extent, it is possible to move the rear axle forward or back relatively to the plates 32. It is preferable, in order to protect the chains 24 and 24' from dust, to inclose each of them in a gear case. Each gear case could be constituted by a trough-shaped sheet metal guard or cover plate 35 secured to the stay plate 32 or 32' (Fig. 13). The arrangement must be made so that the said sheet should fit well the gear case 14. As there is a space between the stay plate 32 or 32' and the rear axle 29 (Fig. 12), the guard plate 35 must terminate coincidently with the corresponding stay plate, and these two parts—the plate 32 and the plate 35—are connected to the rear axle 29 by sheets or strips of leather or of any other flexible material, the object of which is to prevent dust from getting in.

Fig. 14 shows a similar construction, but the driving motion is transmitted from the shaft 2, 2' to the rear wheels not by chains arranged in the interior of the chassis, as in the preceding case, but by exteriorly arranged chains 36 and 36' and pinions 37 and 37', 38 and 38'; the rear axle being then constructed and arranged like the usual rear axles of chain-driven cars.

Figure 15:
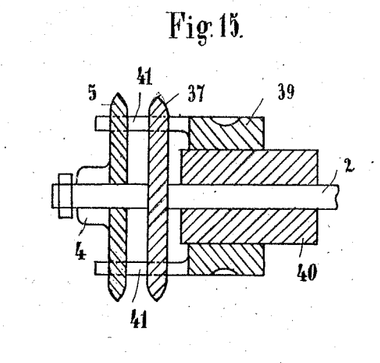
Fig. 15 is an enlarged sectional view showing the mounting of the outside pinions.

The pinion 5 and the pinion 37 are preferably mounted as shown in Fig. 15. The pinion 37 is secured to the shaft 2, while the pinion 5 is mounted on the tubular shaft 4 which is loose on the shaft 2. The part 39 can slide on the part 40 which forms a bearing for the shaft 2, and said part 39 is provided with claws 41 which can engage with orifices provided in the pinions 5 and 37, their optional connection thus being insured. The pinions 5' and 37' are mounted in the same manner.

Figure 16:
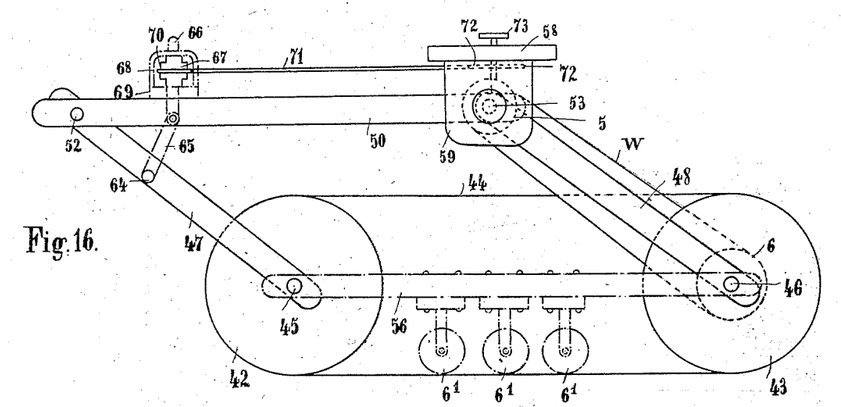
Fig. 16 is a side elevation of one of the tractors.
Figure 17:
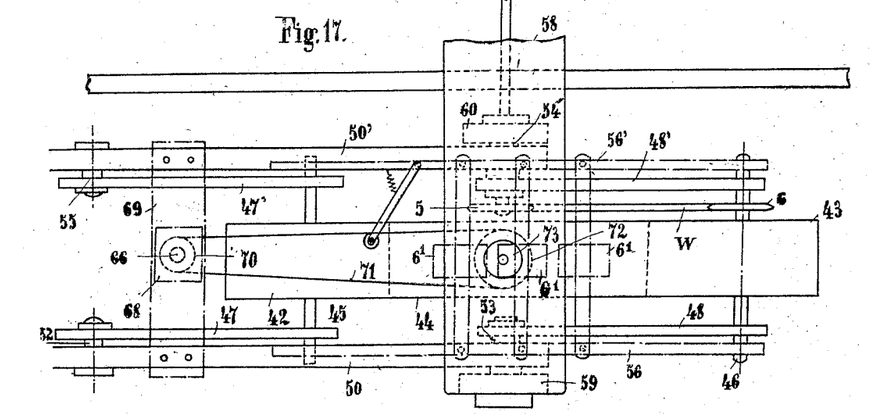
Fig. 17 is a plan view thereof.
Figure 18:
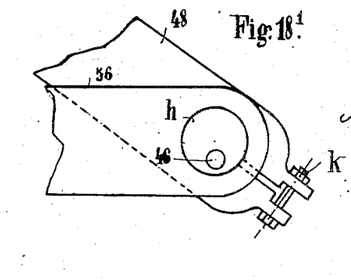
Fig. 18 is a rear elevation.

Figs. 16—18 show one method of mounting the endless tractors on the chassis, these tractors being preferably constituted by endless chains. The pinions 42 and 43 over which passes the endless tractor chain 44, are secured with their shafts 45 and 46 to rods 47, 47', 48 and 48' which are pivoted to two bars 50 and 50' by means of pivot pins or bolts 52, 53, 54 and 55. Two bars 56 and 56' are mounted at the ends of the shafts 45 and 46 and carry rollers 6' which press on the lower section of the chain.

Figure 19:
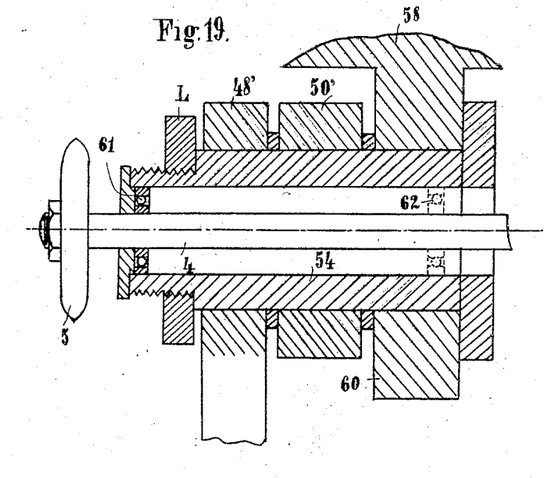
Fig. 19 is an enlarged fragmental sectional view, showing the mounting of parts of the tractor frame.

The two bars 50 and 50' are in their turn pivoted to the chassis of the car in the following manner:

A metal plate 58 is secured transversely to the chassis C in any desired manner, this plate having two projections 59 and 60 to which the bars 50 and 50' are pivoted by means of pins or bolts 53 and 54; the same pins also form pivot pins for the rods 48 and 48'. In other words, the pivot pins 53 and 54 are secured to the projecting parts 59 and 60 of the part 58 and form pivot pins: (1) for the bars 50 and 50' (see Figs. 18 and 19); (2) for the rods 48 and 48'. The pivot pins are held by nuts L. The pivot pin 54 (see Fig. 19) is hollow in order to afford passage to the shaft 4 which carries the pinion 5 (see also Figs. 1 and 8). It is preferable that the above mentioned gear case 14 should fit against the projection 60; the ball bearing 16 shown in Figs. 1 and 2 can then be replaced with advantage by a ball bearing 61 (Fig. 19). Another solution consists in adding another ball bearing 62 (shown in dotted lines in Fig. 19) and in forming the shaft 4 in two parts which are connected by means of a Cardan joint 63 (Fig. 18). The pinion 5 transmits the driving movement preferably by means of a driving chain W to the pinion 6 (Figs. 16–18) which is keyed to the shaft 46.

The rods 47 and 47' and 48 and 48' being pivoted about the pins 52 and 53, 54 and 55, the angle which they make relatively to the bars 50 and 50', can be adjusted at will in any desired manner, for instance by means of the following device; the two rods 47 and 47' are stayed by a bar 64 (Figs. 18 and 16).

To the said bar 64 is pivoted a rod 65 which in its turn is pivoted to a screw-threaded rod 66 (Figs. 16-18), which carries a nut 67 (Fig. 16) held locked in a cage 68 secured to a bar 69 which in its turn is secured to the two bars 50 and 50'. The nut 67 carries a pinion 70 (Figs. 16 and 17) which, by means of a driving chain 71, is connected to a pinion 72, the spindle of which is secured to the plate 58. This pinion can be operated by the driver in any desired manner; for instance it could be provided on its spindle with another pinion 73 with which engages a driving chain.

When the pinion 72 is rotated, this produces a rotation of the nut 67, which results in raising or lowering the rods 47 and 47', as well as the rods 48 and 48', as they are connected together by means of the bars 56 and 56'. The whole forms therefore a parallel motion device which can be adjusted by the means described; this mechanism has for its object to enable the endless tractor chain to be raised or lowered relatively to the chassis.

It must be pointed out that these movements will not affect the tension of the chain, as the distance between the pins 46 and 45 does not vary.

As will be seen, the double quadrilateral which forms the support for the tractor, is pivoted about the pins 53 and 54 (Figs. 17 and 18) as the bars 50 and 50' can freely oscillate about the said pins, thus enabling the tractor to be given the desired inclination according to the surface of the ground.

Any desired system could be provided for stretching the chain W passing over the pinions 5 and 6 (Figs. 16-18). To that end, either the length of the rods 48 and 48' (Figs. 16-18) could be varied by providing them with an adjustment device similar to the chain-stretching devices described in the foregoing, or the spindle 46 could be mounted in two eccentrics, of which it will form the center; these eccentrics supporting respectively, one the bars 48 and 56, and the other the bars 48' and 56'. Fig. 18' shows the method of mounting one of these eccentrics: the eccentric $h$ is mounted in a seat in the bar 48 which is split at its ends, and is securely fixed in its seat by means of a tightening bolt $k$. The spindle 46 rotates in the eccentric; as regards the bar 56, it is mounted on the eccentric which can rotate loosely in the said bar 56. In order to adjust the length of the chain, it will be sufficient to unscrew the nut $k$ and to turn the eccentric.

To prevent the chains W from getting dirty, they could each be inclosed in a gear case.

Figure 21:
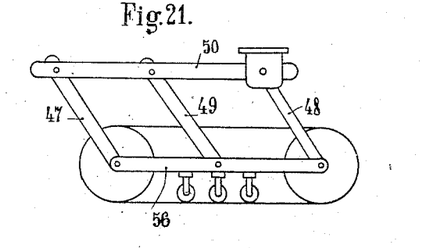
Figs. 21, 22 and 23 are diagrammatic views illustrating various other modifications of the tractor mounting.

Fig. 21 shows a modification of the method of mounting shown in Fig. 16, six pivoted supporting rods being employed instead of four. The two added rods, one of which is indicated at 49 in this figure, are disposed between the rods 47, 47' and 48, 48' and are pivoted to the bars 50 and 50', 56 and 56', the working of the device remaining the same.

Figure 22:
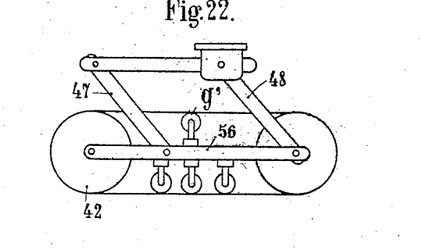

In Fig. 22, the rods 47 and 47' are no longer secured to the spindles of the pinions 42, but to the bars 56 and 56'.

It must be pointed out that it is possible to provide (and this in any methods of mounting) one or more pinions similar to the pinion $g'$ shown in Fig. 22, the object of which is to stretch the upper section of the chain.

Figure 23:
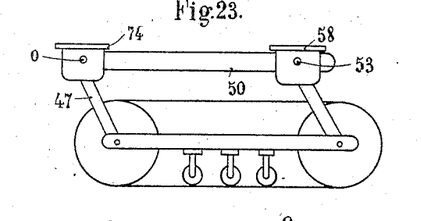

Fig. 23 shows a method of mounting the tractor, in which the pivot joint of the latter about the pins 53 and 54 (see Figs. 17 and 18) is done away with. The bars 47, 47' and 50, 50' are then pivoted by means of a pin O to a cross-bar 74 secured to the chassis, Fig. 23; the bars 50 no longer serve any object and can be done away with. It will be seen in Fig. 23' that the double bars 50 and 50' are replaced by a single bar Q on which are mounted the forks K carrying the tractor pinions. Fig. 23² relates to a device for reversing; it was shown in Fig. 1 that in certain cases a special pinion 21 could be provided for reversing, and it is advisable to connect this pinion to the front pinion of the tractor in the following manner: The pinion 21 transmits its movement by means of a chain to the pinion $p$ placed at the upper front corner of the parallelogram, and the pinion $p$ transmits its movement by means of another pinion mounted on its own spindle, and of a chain, to a pinion $p'$ mounted on the spindle of the pinion 42.

Figure 36:
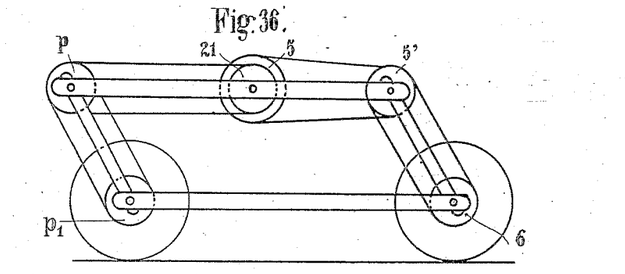

This method of driving could be moreover used also for driving forward, in the event of the tractor being of great length; in such a case, the pinion 5 need not be at the upper front corner of the quadrilateral, but may be located intermediate the ends of the upper member thereof (Fig. 36), in which case it transmits its movement by means of a chain to a pinion 5' placed at the upper rear corner of the quadrilateral, which pinion 5' in its turn transmits the movement to the pinion 6 by means of a pinion mounted on the same spindle with it, and of a chain.

It will be seen that instead of placing the ratchet gears (shown in Figs. 6 and 7) in the pinions 21 and 5, it is also possible to arrange them in the pinions $p'$ and 6 (Fig. 36); the result will be the same.

Figures 18, 20:
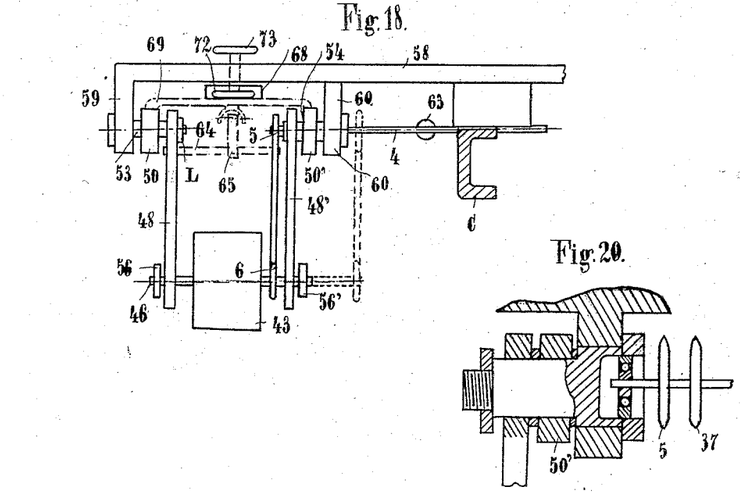
Fig. 20 is a fragmental detail of a modification of the driving gearing represented in Fig. 14.

When using the driving gear shown in Fig. 14, it is preferable to arrange the pinion 5 outside the bars 50 and 50' (Fig. 20), side by side with the pinion 37 (Fig. 14).

Figure 27:
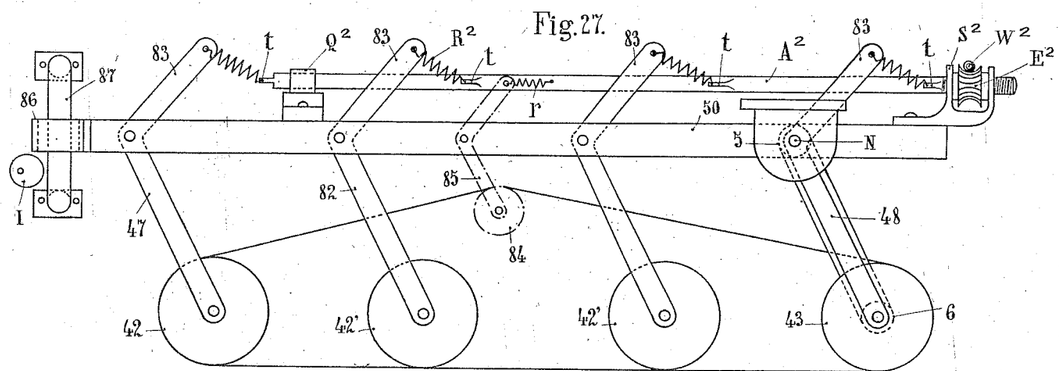
Figs. 27 and 28 show, in side elevation and plan respectively, a form of tractor which is a modification of that illustrated in Figs. 16 and 17.
Figure 28:
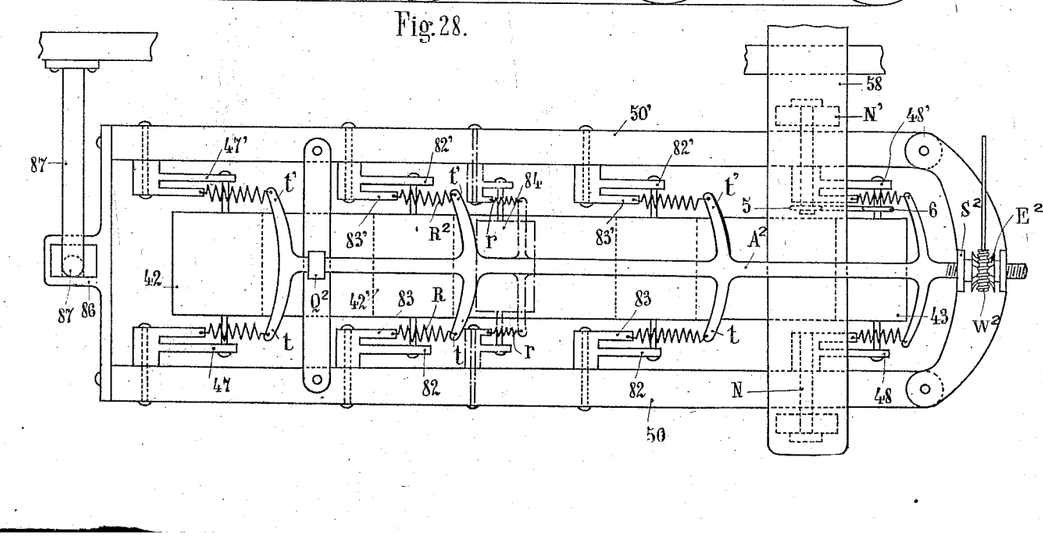
Figure 29:
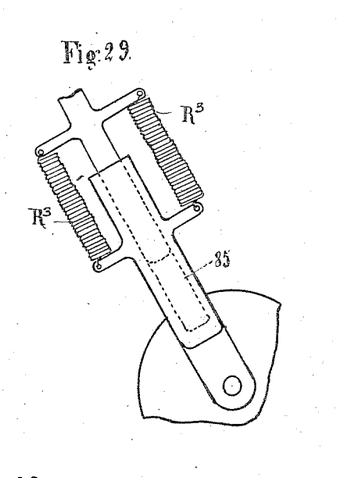
Fig. 29 is an enlarged detail of a modified form of mounting for the stretching roller.

The construction of the endless tractor shown in Figs. 27 and 28, is a modification of the method of mounting shown in Figs. 16 and 17, and is at present preferred to that mounting; the bars 56 supporting the intermediate rollers, are done away with, and each roller is mounted on two rods pivoted to the frame. Thus each roller 42' is supported by two rods 82 and 82' which are pivoted to the bars 50 and 50' which form the frame. Moreover, each of these rods is provided with an extension 83 (83'), each of the said extensions being connected by a spring R (of any desired kind) to arms $t$ and $t'$ provided on a bar $A^2$ which can slide in bearings $Q^2$ and $S^2$ secured to the frame. A roller 84 intended to keep taut the upper section of the endless tractor, is mounted in the same way. Owing to this method of mounting, each roller has a resiliency of its own, and the endless tractor can better adapt itself to the ground. The tension of the springs can be adjusted by moving the bar $A^2$ to the right or to the left. This movement is obtained for instance by rotating a nut $E^2$ mounted on the screwthreaded end of the bar and held in a cage secured to the frame. This nut can be provided outside with teeth (for instance of helical shape), and is rotated by a pinion $W^2$ controlled from the driver's seat. When the bar $A^2$ is moved to a sufficient extent to the left, the arms $t$ and $t'$ will come into contact with the rods 83 and 83' and push them back, owing to which the endless tractor will be raised above the ground. In order to increase the flexibility of the stretching roller 84, its carrier rods 85 could be provided with additional springs: these rods 85 may be made in two parts sliding in each other, as shown in Fig. 29 and held by springs $R^3$. Several stretching rollers could be provided, mounted in the same way as the roller 84.

To prevent the front of the frame of each tractor from deviating in the lateral direction, while allowing it to oscillate freely about pins N and N', it could be guided by means of a guide bracket 86 secured to the frame and sliding on the rod 87 secured to the chassis of the vehicle. When the tractor is raised above the ground, the guide bracket could be locked on the rod, for instance by the rotation of an eccentric I (Fig. 27), the spindle of which is secured to the chassis of the vehicle and which, according to its position, can either press against the guide bracket 86 (when in the position shown in Fig. 27) or leave it free.

It must be pointed out that this guide bracket device could also be applied to the mounting of the tractor shown in Fig. 16.

It will be seen that it is not necessary that the pinion 43 (Fig. 27) which receives the driving movement, should be situated at the rear end of the tractor; one or more additional pinions could be arranged behind it.

In certain cases it will be possible to do away with the pivoting of the frame about the pins N and N', in which instance the frame will be secured to the chassis of the vehicle by means of two cross-bars T and T' (Fig. 32)—a method of mounting similar to that of Fig. 23; but it must be pointed out that the cross-bars could be secured at any desired points of the frame.

Figure 30:
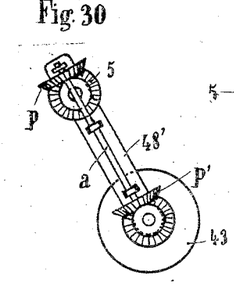
Figs. 30 and 31 represent modifications of the tractor drive.
Figure 31:
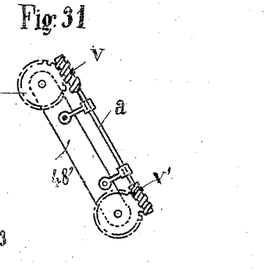

Figs. 30 and 31 show modified forms of drive between the pinions 5 of the crossshaft (see also Figs. 27 and 28) and the pinions driving the endless tractor chain. In the case of Fig. 27, each tractor is driven by means of the two pinions 5 and 6 and of a driving chain. In Fig. 30, the driving is effected by means of bevel pinions $p$ and $p'$ and of a spindle $a$; in Fig. 31, by means of helical pinions $v$ and $v'$ and of a spindle $a$.

In certain cases it is preferable to use for the tractors of vehicles intended for soft ground, endless belts in place of endless chains.

Figure 32:
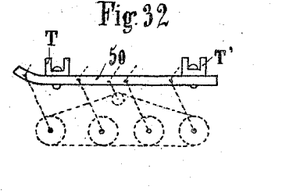
Figs. 32, 33 and 34 are diagrammatic views representing modifications of the construction shown in Fig. 1.
Figure 33:
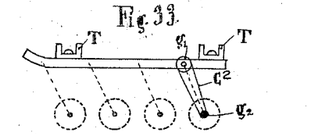
Figure 34:
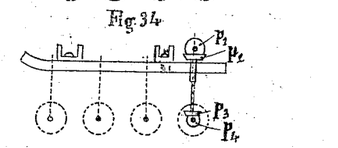
Figure 35:
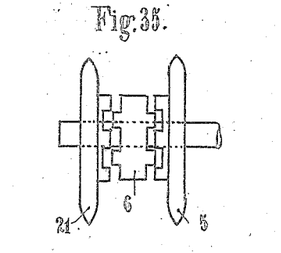
Fig. 35 is an enlarged transverse section through the clutch mechanism of Fig. 36, which represents a further modified driving system.

It is also possible to use elastic chain or belt tractors, and it is then advisable to secure the tractors to the chassis of the vehicle by cross-bars T (Fig. 33) by a method of mounting similar to that shown in Fig. 32, the cross-bars being secured, on the one hand, to the chassis of the vehicle, and on the other hand, to the frames of the two tractors. For the sake of simplicity, the drawing shows merely diagrammatically the frame of an elastic tractor, as well as the lower rollers which, in Fig. 33, are pivoted; the driving is preferably effected by means of the pinions $q'$ and $q^2$ and of the driving chain $C^2$. When (still referring to the case of an elastic tractor) the rollers are mounted in a sliding manner (Fig. 34) it is preferable to drive by means of a spindle and bevel pinions $p^1$ and $p^2$, $p^3$ and $p^4$; the pinion $p^1$ being mounted on the crossshaft of the vehicle.

Figure 24:
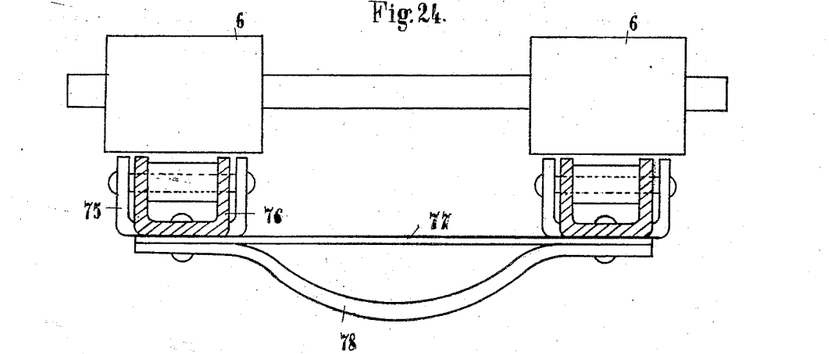
Figs. 24 and 25 are, respectively, a transverse section and a detail plan view of a double-chain tractor.
Figure 25:
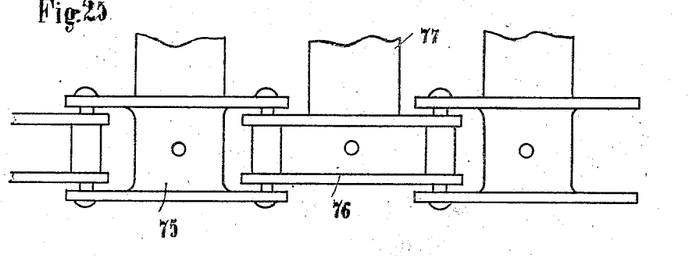
Figure 26:
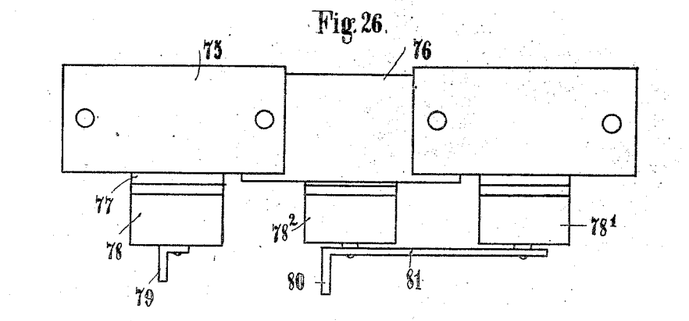
Fig. 26 is a detail of a development of the construction shown in Figs. 24 and 25.

Any other desired type of endless track, chains or belts etc. may also be used. When it is desired to utilize tractors of a very great width, it is preferable to use a double chain of the following construction (Figs. 24–26); the links 75 and 76 of each chain have a rectangular U-section, the opposite links of the two chains being connected by rods 77 secured to the links; to the links are also secured plates 78 which will bear on the ground and which can have a certain elasticity.

It goes without saying that the rollers 6 will be double, as well as the pinions 42 and 43 (Fig. 16), which does not change anything in the method of mounting above described.

On certain kinds of ground, it is preferable to secure plates 79 forming blades or wings, to the plates 78 (see Fig. 26), and it is also possible to use blades or wings 80 secured to a flexible metal rod 81 which is secured to the part 78' and arranged in such a manner that the blade or wing 80 rests (without being secured to it) on the part 78². On hard roads, the vehicle will travel merely by means of its wheels, the tractors being raised and out of gear, but on soft ground they will be lowered and thrown into gear, and they will assist the wheels. The ratios of transmission are calculated so that the endless tractor chains and the wheels will have approximately the same speed relatively to the ground.

In the event of the vehicle being utilized to travel over snow, it is advisable to replace its front wheels by runners and to provide its rear wheels with an antiskidding device, for instance that described in my prior Patent No. 1,225,999 granted May 15, 1917.

Figure 37:
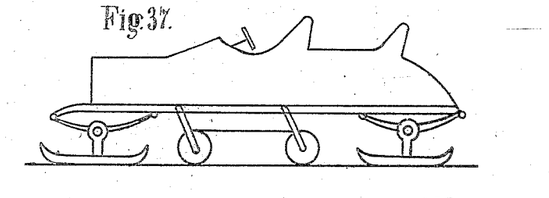
Fig. 37 shows the invention applied to a vehicle designed to travel over snow.

Another combination would be to replace not only the front wheels by runners, but also to replace the rear wheels by runners as shown in Fig. 37. For this purpose there would be adopted one of the known systems enabling a wheel to be replaced by a runner, or a runner to be placed under a wheel. For the front wheels it is preferable to adopt the arrangement disclosed in my co-pending application, Serial No. 189,767, filed September 5, 1917.

Figures 38, 39:
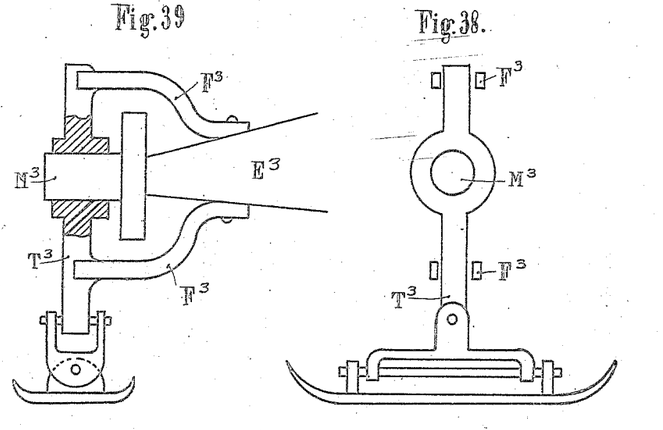
Figs. 38 and 39 represent details relating to the mounting of the runners of such vehicle.
Figure 231:
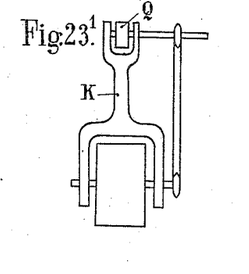
Figure 232:
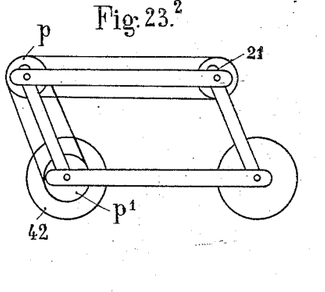

This system could also be applied to the rear wheels, in which case the device would be as follows:

Each rear wheel will be replaced (Figs. 38 and 39) by a rod $T^3$ carrying at its base a runner pivoted to it; a fork $F^3$ secured to the rear axle $E^3$, prevents the rod $T^3$ from turning about the hub $M^3$ (this fork $F^3$ can straddle either the upper or the lower portion of rod $T^3$, as will be understood from Figs. 38 and 39).

It is essential to bear in mind that all the devices described can be varied in a considerable manner without departing from the spirit of the invention.

Claims:

1. In a motor vehicle, for soft ground, the combination of a motor; a shaft arranged transversely of the vehicle and provided with a differential; a transmission connection between the motor shaft and the transverse shaft; a driving axle for the rear wheels comprising a pair of spindles to which the said wheels are secured, and a casing inclosing said spindles; outer and inner pinions at each end of the transverse shaft; a pair of tractors located at opposite sides of the vehicle; a chain drive between each outer pinion and the adjacent tractor; a chain drive between each inner pinion and the adjacent spindle; and a clutch device on said transverse shaft for throwing the tractors into and out of operation.

2. In a motor vehicle for soft ground, the combination of a motor; a shaft arranged transversely of the vehicle and connected with the motor to be driven therefrom; a pair of frames connected with the chassis of the vehicle at opposite sides thereof; a tractor carried by each frame and comprising a plurality of rods pivoted intermediate their ends in the frame and having rollers at their lower ends, an endless flexible element passing around said rollers, and a device slidably mounted in said frame and associated with said pivoted rods for rocking them about their pivots so as to raise said rollers; and driving connections between said transverse shaft and said tractors.

3. In a motor vehicle for soft ground, the combination of a motor; a shaft arranged transversely of the vehicle and connected with the motor to be driven therefrom; a pair of frames connected with the chassis of the vehicle at opposite sides thereof; a tractor carried by each frame and comprising a plurality of rods pivoted intermediate their ends in the frame and having rollers at their lower ends, an endless flexible element passing around said rollers, springs connected with the upper ends of said pivoted rods to normally press said rollers toward the ground, and a device slidably mounted in said frame for varying the tension of said springs; and driving connections between said transverse shaft and said tractors.

4. In a motor vehicle for soft ground, the combination of a motor; a shaft arranged transversely of the vehicle and connected with the motor to be driven therefrom; a pair of frames connected with the chassis of the vehicle at opposite sides thereof; a tractor carried by each frame and comprising a plurality of rods pivoted intermediate their ends in the frame and having rollers at their lower ends, an endless flexible element passing around said rollers, and a device slidably mounted in said frame and provided with lateral arms engageable with the upper ends of the pivoted rods to rock said rods about their pivots so as to raise said rollers; and driving connections between said transverse shaft and said tractors.

5. In a motor vehicle for soft ground, the combination of a motor; a shaft arranged transversely of the vehicle and connected with the motor to be driven therefrom; a pair of frames connected with the chassis of the vehicle at opposite sides thereof; a tractor carried by each frame and comprising a plurality of rods pivoted intermediate their ends in the frame and having rollers at their lower ends, an endless flexible element passing around said rollers, a device supported in said frame and provided with lateral arms, and springs connecting the extremities of said arms with the upper ends of the pivoted rods to press said rollers toward the ground, said device being mounted for sliding movement to adjust the tension of said spring; and driving connections between said transverse shaft and said tractors.

6. In a motor vehicle for soft ground, the combination of a motor; a shaft arranged transversely of the vehicle and connected with the motor to be driven therefrom; a pair of frames connected with the chassis of the vehicle at opposite sides thereof; a tractor carried by each frame and comprising a plurality of rods pivoted intermediate their ends in the frame and having rollers at their lower ends, an endless flexible element passing around said rollers, a device supported in said frame and provided with lateral arms, and springs connecting said arms with the upper portions of said pivoted rods to press said rollers toward the ground, said device being mounted for sliding movement to adjust the tension of said springs and to engage the ends of its arms with the ends of said rods to rock the latter about their pivots and thereby raise said rollers; and driving connections between said transverse shaft and said tractors.

7. In a motor vehicle for soft ground, the combination of a motor; a shaft arranged transversely of the vehicle and connected with the motor to be driven therefrom; a pair of frames pivotally connected adjacent their rear ends to the chassis of the vehicle at opposite sides thereof; a guide bracket secured to the front end of each frame; a pair of rods secured to opposite sides of the chassis and engaged with said brackets; elevating means associated with the front end of each frame; an endless flexible tractor supported by each frame; and driving connections between said transverse shaft and said tractors.

8. In a motor vehicle for soft ground, the combination of a motor; a shaft arranged transversely of the vehicle and connected with the motor to be driven therefrom; a pair of frames pivotally connected adjacent their rear ends to the chassis of the vehicle at opposite sides thereof; a guide bracket secured to the front end of each frame; a pair of rods secured to opposite sides of the chassis and engaged with said brackets; a pair of eccentrics carried by the chassis and engageable with the adjacent guide brackets to raise or lower the front ends of the frames; an endless, flexible tractor supported by each frame; and driving connections between said transverse shaft and said tractors.

9. In a motor vehicle for soft ground, the combination of a motor; a shaft arranged transversely of the vehicle and connected with the motor to be driven therefrom; a pair of frames pivotally connected intermediate their ends to the chassis of the vehicle to rock about an axis transverse to the chassis; means for elevating the front ends of said frames; a tractor carried by each frame and comprising a plurality of rods pivoted to the frame and having rollers at their lower ends, and an endless, flexible element passing around said rollers; means for rocking the rods of each tractor about their pivots to raise the tractor relatively to its frame; and driving connections between said transverse shaft and said tractors.

10. In a motor vehicle for soft ground, the combination of a motor; a shaft arranged transversely of the vehicle and connected with the motor to be driven therefrom; a pair of frames pivotally connected intermediate their ends to the chassis of the vehicle to rock about an axis transverse to the chassis; means for elevating the front ends of said frames; an endless, flexible tractor carried by each frame; means independent of said elevating means for raising said tractors relatively to their frames; and driving connections between said transverse shaft and said tractors.

11. In a motor vehicle for soft ground, the combination of a motor; a shaft arranged transversely of the vehicle and connected with the motor to be driven therefrom; a pair of frames connected with the chassis of the vehicle at opposite sides thereof; a tractor carried by each frame and comprising a plurality of rods pivoted one in front of another in the frame and having rollers at their lower ends, an endless flexible element passing around said rollers, a longitudinally-arranged rod slidable endwise in the frame and provided with laterally-projecting arms, springs connecting said arms and pivoted rods together and acting to normally press said rollers toward the ground, and operating means for said longitudinal rod; and driving connections between said transverse shaft and said tractors.

12. In a motor vehicle for soft ground, the combination of a motor; a transverse shaft carried by the vehicle and connected with the motor to be driven therefrom; a pair of tractor frames pivoted to the chassis of the vehicle at opposite sides thereof; an endless, flexible tractor carried by each frame; means for tilting said frames about their pivots; means for guiding the frames during their tilting movements; means independent of the tilting means for raising said tractors relatively to their frames; and driving connections between said transverse shaft and said tractors.

13. In a motor vehicle for soft ground, the combination of a motor; a transverse shaft carried by the vehicle and connected with the motor to be driven therefrom; a pair of tractors located at opposite sides of the vehicle, each tractor comprising two spaced, endless chains, the opposite links of which are connected together, and curved metal plates secured to said chains and having ground-engaging projections thereon; and driving connections between said transverse shaft and said tractors.

In testimony whereof I have signed this specification in the presence of two subscribing witnesses.

JOCELYN EMILE OLLIVIER.

Witnesses:
Wm. George,
Fernand Broisat.